Figure 1:
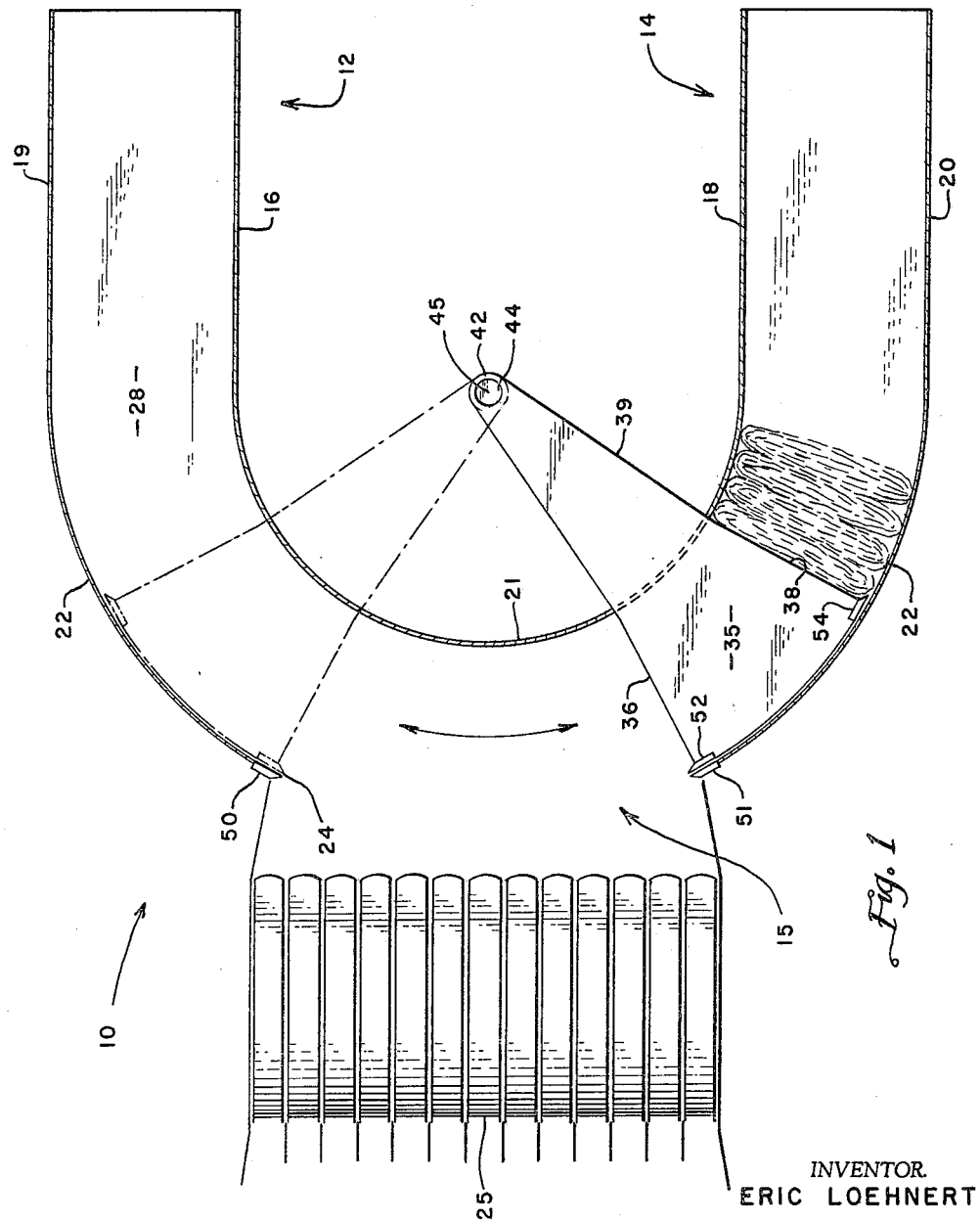

May 26, 1964     E. LOEHNERT     3,134,321
HAY BALER

Filed Feb. 7, 1963                           2 Sheets-Sheet 1

INVENTOR.
ERIC LOEHNERT
BY
*Walter V. Wright*
AGENT

May 26, 1964 E. LOEHNERT 3,134,321
HAY BALER
Filed Feb. 7, 1963 2 Sheets-Sheet 2
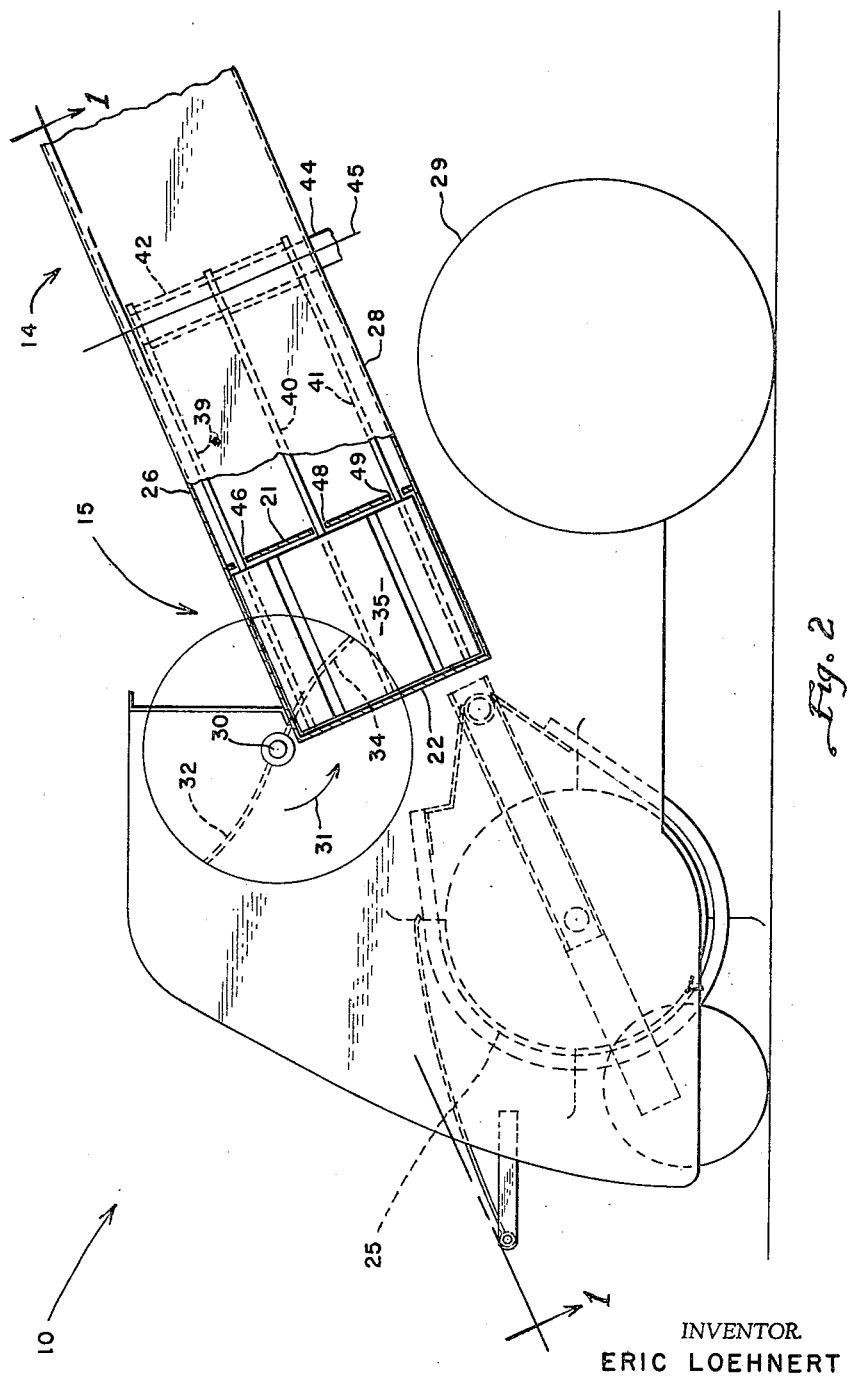
INVENTOR.
ERIC LOEHNERT
BY
AGENT 3,134,321
HAY BALER
Eric Loehnert, New Holland, Pa., assignor to Sperry Rand Corporation, New Holland, Pa., a corporation of Delaware
Filed Feb. 7, 1963, Ser. No. 256,881
9 Claims. (Cl. 100—98)

This invention relates to hay balers of the type adapted to be moved through a field of cut and windrowed hay to form the hay into bales.

Conventional field hay balers employ the co-action of a bale forming chamber and a plunger movable to and fro in the chamber in alternate compression and retraction strokes to compress hay into bales. Other conventional components of these machines are an infeed mechanism to move hay into the bale chamber in timed relation to the strokes of the plunger and a pick-up mechanism to lift the hay from the ground up to the infeed mechanism. The infeed mechanism and the driving thereof in timed relation to the plunger is generally an expensive complex portion of the machine in general. Moreover, while the plunger consumes power on both its compression and its retraction strokes, it performs useful work, namely compression of the hay, only on the compression stroke. In one sense, the power consumed by the retraction stroke of the plunger is wasted. In conventional hay balers it is common to drive the plunger by means of a gearbox and crank mounted on the bale case. Thus, in addition to the forces exerted by the hay, the bale case must carry the inertia and reaction forces associated with the plunger, which are transmitted to the bale case through the crank and gearbox.

In the well known conventional arrangement of the components of a baler wherein the bale case lies along one side of the machine and the pick-up and infeed mechanism are disposed to one side of the bale case, the weight distribution of the baler is unbalanced relative to the line of ground travel. This arrangement of components requires an unbalanced frame structure with associated draft and suspension problems such as the necessity of using tires of unequal size at the two sides of the baler.

In the field of hay processing there is an area of interest in the forming of light weight cube-type bales. This type of bale lends itself to random mechanical handling and artificial drying. However, these bales are preferably formed in a bale chamber having smaller cross sectional dimensions than those of the conventional bale case. This creates certain special problems for the conventional type baler. With a smaller bale case, if the ton per hour capacity of the machine is not to be lowered below present standards, the strokes per minute of the plunger must be considerably higher than that of present balers for a given ground speed of the machine. This greatly increases the stress on the machine in general, and particularly on the tying mechanism which must complete a tie between plunger strokes.

It is the general object of this invention to provide an improved, simplified mobile hay baler.

It is another object of this invention to provide a low cost high capacity mobile hay baler.

It is another object of this invention to provide a hay baler wherein the power consumed is more fully and advantageously utilized than in conventional balers.

It is another object of this invention to more fully and advantageously utilize the plunger unit of a hay baler.

It is another object of this invention to provide a hay baler which eliminates the non-productive retraction stroke of the plunger.

It is another object of this invention to provide a hay baler wherein the operation of, and mechanism for, feeding hay into the machine is greatly simplified.

It is another object of this invention to provide a mobile hay baler which is both structurally and operationally symmetrical relative to the line of travel of the baler thereby facilitating the static and dynamic balancing and supporting of the baler, as well as rendering the baler readily adaptable into a self propelled unit.

It is another object of this invention to provide a hay baler wherein the plunger and drive mechanism therefor may be carried by a strong compact supporting frame independent of the bale case and centered relative to the line of ground travel thereby facilitating the balancing and supporting of the baler as well as relieving the bale case of the inertia and reaction forces of the plunger.

It is another object of this invention to provide a hay baler design which lends itself to the production of small cross section cube-type bales at a high ton per hour capacity with a standard stroke per minute plunger speed.

It is another object of this invention to provide, in a mobile hay baler, a novel arrangement of two separate bale chambers and a single plunger wherein the single plunger serves the dual functions of feeding and compressing hay into both chambers.

It is another object of this invention to provide a mobile hay baler having a generally U-shaped bale case wherein the two legs of the U constitute bale forming chambers and the bight portion of the U constitutes a hay receiving and feeding chamber and wherein a single plunger oscillates within the receiving chamber to simultaneously form a bale of hay in each of the bale chambers.

These and other objects and advantages of this invention will be apparent upon reference to the following description and claims taken in conjunction with the accompanying drawings wherein:

FIG. 1 is a diagrammatic sectional view of a hay baler taken on the line 1—1 of FIG. 2 with certain parts omitted to better show the invention; and FIG. 2 is a diagrammatic side elevational view of the baler shown in FIG. 1 with a portion of the bale case broken away to better show the plunger.

In the drawings, the numeral 10 refers generally to a hay baler. The baler 10 has a bale case formed in the shape of the letter U. The leg portions of the bale case constitute first and second bale forming chambers 12 and 14, respectively, while the forwardly disposed bight portion of the U constitutes a hay receiving and feeding chamber 15. The chambers 12 and 14 have inwardly disposed vertical planar sides 16 and 18, respectively, and outwardly disposed vertical planar sides 19 and 20, respectively. A first arcuate forward wall 21 interconnects the inwardly disposed sides 16 and 18 of the chambers 12 and 14, while a second arcuate forward wall 22 interconnects the outwardly disposed sides 19 and 20 of the two bale forming chambers. The first and second arcuate forward walls 21 and 22 are concentric, and the second wall 22 is spaced forwardly of the first arcuate wall 21 by a distance equal to the transverse width of the chambers 12 and 14. An infeed opening 24 is provided in the second, or forwardmost, forward wall 22 through which crop material may pass rearwardly from a conventional pickup 25 into the receiving chamber 15 of the bale case. The bale chambers are open at their forward and rear ends to receive hay from the feeding chamber and to discharge completed bales rearwardly. Each of the three chamber portions of the U-shaped bale case has a planar top and bottom, as indicated respectively at 26 and 28 in FIG. 2 of the drawings. At least the bottoms of the three chamber portions of the bale case should lie in a common plane as shown. As shown in FIG. 2, the bale case is preferably, although not necessarily, inclined upwardly toward the rear of the machine. This facilitates the transfer of the completed bales from the bale case into a trailing wagon, as well as enabling the rear wheels 29 (one indicated) of the machine to be disposed under the bale case to minimize the overall width of the machine.

As best seen in FIG. 2, infeed mechanism may be provided in the form of a simple rotatable cross shaft 30 rotated in the direction indicated by the arrow 31 and carrying two sets of feed fingers 32 and 34. A slot (not shown) is provided in the top 26 of the infeed chamber portion 15 of the bale case for each finger of the two sets of fingers 32 and 34. The path of travel of the sets of fingers 32 and 34 is into the front of the bale case through opening 24 in the forward wall 22 and out through the top 26 of the hay receiving chamber portion 15 of the bale case.

Disposed within the arcuate portion of the bale case is a plunger 35. Plunger 35 has first and second opposed material compressing faces 36 and 38, respectively (FIG. 1). As seen in FIG. 2, the plunger is supported by three arms 39, 40 and 41 which are carried by a sleeve-like member 42 which is carried by a heavy shaft 44 whose axis 45 extends through the center of curvature of the arcuate forward portion of the bale case (see FIG. 1). The axis 45 extends perpendicular to the plane of the bottom 28 of the bale case (see FIG. 2). The arms 39, 40 and 41 extend through slots 46, 48 and 49 (FIG. 2) in first, or rearmost, arcuate forward wall 21 of the receiving and feeding chamber 15. Thus, the plunger is supported for oscillatory swinging movement within the arcuate bight portion of the bale case and about an axis 45 through the center of curvature of the bight portion of the bale case. The shaft 44 may be oscillated by conventional mechanism (not shown) to drive the plunger.

One advantage of the above arrangement of bale case and plunger is that the shaft 44 and the gearbox and power source (not shown) therefor may be supported by a compact, rigid frame (not shown) disposed in the center of the machine relative to the direction of ground travel and carried equally by the adjacently disposed rear wheels 29.

In FIG. 1 it may be seen that the bale forming chambers 12 and 14 and, in fact, the whole machine is symmetrical relative to a vertical plane extending in the direction of ground travel and passing through the center of curvature of the bight portion of the U-shaped bale case. It may be seen in FIG. 1 that a first pair of knives 50 and 51, respectively, are carried by the arcuate forward wall 22 of the bale case at each side of the infeed opening 24. A second pair of knives 52 and 54, respectively, are carried by the plunger at the forwardmost edges of the first and second material compressing faces 36 and 38.

The cross shaft 30 of the infeed mechanism is rotated in timed relation to the oscillations of the plunger and a single cycle of operation of the plunger is as follows, referring to FIG. 1:

As the plunger 35 swings from the solid line position transversely across infeed 24 toward the dotted line position, the infeed fingers 34 (see FIG. 2) move hay into the chamber 15 and then move upwardly out of the top of the chamber. The first plunger face 36 carries the hay across chamber 15 until knife 52 co-acts with knife 50 to sever the hay ahead of face 36 from the hay remaining outside of chamber 15. The plunger continues across and rearwardly to the dotted line position to compress the hay rearwardly into first bale forming chamber 12. The plunger 35 then returns across chamber 15 with the fingers 32 of the infeed mechanism depositing more hay ahead of the second compressing face 38 of the plunger. The plunger knife 54 co-acts with fixed knife 51 to sever the hay and the plunger moves rearwardly to the solid line position to compress the hay rearwardly into second bale forming chamber 14. Since the plunger performs a large portion of the feeding function as well as the compressing function, the infeed mechanism required is minimal and simple.

In some cases, particularly if the rear portions of the bale case are lowered to a more horizontal position, it may be permissible to eliminate separate infeed mechanism completely.

It will be seen from the above, that the plunger has no non-productive retraction stroke. Each swing of the plunger feeds and compresses hay into one or the other of the two bale forming chambers to form two bales simultaneously. A conventional needle and knotter unit (not shown) is provided for each of the bale forming chambers 12 and 14. It will be apparent that a baler of the disclosed type will have considerably higher capacity than the conventional single bale chamber baler, or if desired for the production of cube-type bales, the cross sectional size of the bale case may be reduced below standard size without proportionally lowering the ton per hour capacity below acceptable present standards or increasing the strokes per minute of the plunger above present standards. Both the structure and operation of the above baler are symmetrical relative to a vertical plane through the axis of oscillation of the plunger. Thus, in addition to the advantage of enabling the plunger to be supported and driven from a compact frame independent of the bale case, a baler of the above type provides the additional advantages of enabling the manufacturer to produce larger quantities of fewer parts while enabling dealers to stock fewer parts. It will also be apparent that the symmetry and balance of this machine is such that it is readily adaptable into a self propelled unit.

While this invention has been described in connection with a particular embodiment thereof, it will be understood that it is capable of modification, and this application is intended to cover any variations, uses, or adaptations following, in general, the principles of the invention and including such departures from the present disclosure as come within known or customary practice in the art to which the invention pertains, and as fall within the scope of the invention or the limits of the appended claims.

Having thus described my invention, what I claim is:

1. A hay baler comprising a pair of separate bale forming chambers, means mounting said pair of chambers for movement as a unit over the ground in a forward direction with said pair of chambers laterally spaced apart from each other and each extending generally in the direction of travel over the ground, each of said chambers being open at the forward end thereof to receive hay or the like material to be baled and open at the rear end thereof to discharge formed bales, a single hay compressing plunger having first and second opposed hay engaging faces, means mounting said plunger for oscillatory swinging movement about an axis lying in a fore-and-aft extending vertical plane disposed midway between said laterally spaced chambers, and means swinging said plunger about said axis in first one direction to move said first hay engaging face laterally in front of said axis and then rearwardly toward the open forward end of one of said pair of bale forming chambers and then in the opposite direction to move said second hay engaging face laterally in front of said axis and then rearwardly toward the open forward end of the other of said pair of bale forming chambers.

2. A hay baler comprising the combination of a pair of spaced apart bale forming chambers, each of said chambers having first and second sides, a top, a bottom and each chamber being open at one end to receive hay and open at the other end to discharge bales, means mounting said pair of chambers for movement over the ground as a unit with said chambers disposed symmetrically relative to a vertical plane extending in the direction of ground travel, a single hay compressing plunger having first and second opposed hay engaging faces, means mounting said plunger for oscillatory swinging movement in an arc perpendicular to said vertical plane and about an axis lying in said vertical plane, said arc of oscillation of said plunger terminating on one side of said vertical plane at said one end of one of said pair of bale chambers and said arc terminating on the other side of said vertical plane at said one end of the other of said pair of bale chambers, means for depositing hay in the path of travel of said plunger, and means for swinging said plunger through said arc of oscillation about said axis in first one direction whereupon said first hay engaging face engages hay deposited in the path of travel of said plunger and compresses it into said one of said pair of bale chambers and then in the opposite direction whereupon said second hay engaging face engages hay deposited in the path of travel of said plunger and compresses it into said other of said pair of bale chambers.

3. A hay baler comprising the combination of a generally U-shaped bale case having first and second parallel leg portions interconnected by a generally arcuate bight portion, means mounting said bale case for movement over the ground with said bight portion disposed forwardly and said first and second leg portions laterally spaced and extending generally rearwardly from the bight portion, said first and second leg portions, respectively, being first and second bale forming chambers having open rearmost ends to discharge formed bales of crop material, an opening in said bight portion for receiving into said bale case crop material to be baled, a plunger disposed within the arcuate bight portion of said bale case and having first and second opposed crop material compressing faces, means mounting said plunger for oscillatory swinging movement within said arcuate bight portion of the bale case, and means swinging said plunger transversely across said material receiving opening first in one direction and then rearwardly to compress crop material received through said opening rearwardly by said first material compressing face into said first bale forming leg portion and then back across said opening in the opposite direction and then rearwardly to compress crop material received through said opening rearwardly by said second material compressing face into said second bale forming leg portion.

4. A hay baler comprising the combination of a generally U-shaped bale case having first and second parallel leg portions interconnected by an arcuate bight portion, means mounting said bale case for movement over the ground with said bight portion disposed forwardly and said first and second leg portions laterally spaced and extending generally rearwardly from the bight portion, each of said leg portions comprising a bale forming chamber open at its forward end to receive hay to be baled and open at its rear end to discharge bales of hay rearwardly from the bale case, said arcuate bight portion of the generally U-shaped bale case comprising a hay receiving chamber communicating with the open forward end of each of said bale forming chambers and having a forwardly disposed hay receiving opening in the center forward part thereof, said bale forming chambers and said hay receiving chamber each having a bottom lying in a common plane, a plunger disposed within said arcuate bight portion of the bale case and having first and second opposed hay compressing faces, means mounting said plunger for oscillatory swinging movement within said bight portion and about an axis extending through the center of curvature of the arcuate bight portion, said axis extending perpendicular to said plane common to the bottom of said bight portion and the bottoms of said first and second bale forming chambers, and means swinging said plunger transversely across said hay receiving chamber first in one direction and then rearwardly to compress hay in said receiving chamber rearwardly into said first bale forming chamber by said first hay compressing face and then back across said hay receiving chamber in the opposite direction and then rearwardly to compress hay in said receiving chamber rearwardly into said second bale forming chamber by second hay compressing face.

5. A hay baler comprising the combination of a generally U-shaped bale case having first and second parallel leg portions interconnected by an arcuate bight portion, means mounting said bale case for movement over the ground with said bight portion disposed forwardly and said first and second leg portions laterally spaced and extending generally rearwardly from the bight portion, each of said leg portions comprising a bale forming chamber open at its forward end to receive hay to be baled and open at its rear end to discharge bales of hay rearwardly from the bale case, said arcuate bight portion of the generally U-shaped bale case comprising a hay receiving chamber communicating with the open forward end of each of said bale forming chambers and having a forwardly disposed hay receiving opening in the center forward part thereof, feed means disposed forwardly of said hay receiving opening and operable to feed hay rearwardly through said opening into said hay receiving chamber, said bale forming chambers and said hay receiving chamber each having a bottom lying in a common plane, a plunger disposed within said arcuate bight portion of the bale case and having first and second opposed hay compressing faces, means mounting said plunger for oscillatory swinging movement within said bight portion and about an axis extending through the center of curvature of the arcuate bight portion, said axis extending perpendicular to said plane common to the bottom of said bight portion and the bottoms of said first and second bale forming chambers, and means swinging said plunger transversely across said hay receiving chamber first in one direction and then rearwardly to compress hay in said receiving chamber rearwardly into said first bale forming chamber by said first hay compressing face and then back across said hay receiving chamber in the opposite direction and then rearwardly to compress hay in said receiving chamber rearwardly into said second bale forming chamber by second hay compressing face.

6. A hay baler comprising a first bale forming chamber having sides, a top, a bottom and having open forward and rear ends, a second bale forming chamber having sides, a top, a bottom and having open forward and rear ends, means mounting said first and second chambers for movement forwardly over the ground as a unit with said sides extending generally in the direction of ground travel and said first and second chambers spaced apart laterally from each other whereby one side of each of said chambers is disposed inwardly toward the other chamber while the other side of each of said chambers is disposed outwardly away from the other chamber, a first arcuate forward wall interconnecting the forward ends of the inwardly disposed sides of said chambers, a second arcuate forward wall interconnecting the forward ends of the outwardly disposed sides of said chambers, said second forward wall being parallel to and spaced forwardly from said first forward wall thereby forming a generally U-shaped bale case wherein the legs of the U each constitute one of said bale forming chambers and the forwardly disposed arcuate bight portion of the U constitutes a chamber for the reception of crop material to be baled, said second arcuate wall being provided with a centrally disposed inlet opening through which material to be baled may move rearwardly into said receiving chamber, a plunger disposed within said receiving chamber and mounted for arcuate swinging movement between and concentric to said first and second arcuate forward walls, said plunger having first and second laterally opposed material compressing faces, and means for swinging said plunger in an arc within said receiving chamber and past said inlet opening in first one lateral direction and then rearwardly toward said first bale forming chamber and then in the opposite lateral direction and then rearwardly toward said second bale forming chamber.

7. A hay baler as recited in claim 6 wherein a pair of knives are carried by said second forward wall, said knives being disposed respectively at the sides of said inlet opening and wherein a pair of knives are carried by said plunger, said plunger knives being disposed respectively at the forward-most edges of said first and second plunger faces, one of said plunger knives cooperating with one of said second wall knives each time said plunger moves past said opening to sever crop material in said receiving chamber from crop material remaining outside said receiving chamber.

8. A hay baler as recited in claim 7 wherein feed means is disposed forwardly of said inlet opening and operable to move crop material rearwardly through said opening and into said receiving chamber.

9. A hay baler as recited in claim 6 wherein said receiving chamber has a bottom lying in the same plane as the bottoms of said first and second bale forming chambers, said plane being inclined upwardly toward the rear of said unit relative to the direction of ground travel.

References Cited in the file of this patent

UNITED STATES PATENTS

| | | |
|---|---|---|
| 163,432 | Wrightington | May 18, 1875 |
| 422,847 | Spencer | Mar. 8, 1890 |
| 2,727,457 | Hedtke | Dec. 20, 1955 |

FOREIGN PATENTS

| | | |
|---|---|---|
| 1,017,252 | France | Sept. 17, 1952 |